(12) United States Patent
Tsutsui (10) Patent No.: US 8,085,169 B2
(45) Date of Patent: Dec. 27, 2011

(54) APPARATUS AND METHOD FOR MAP DISPLAY AND IMAGING APPARATUS AT A PLURALITY OF DISPLAY RESOLUTIONS

(75) Inventor: Masanao Tsutsui, Kanagawa (JP)

(73) Assignee: Sony Corporation (JP)

( * ) Notice: Subject to any disclaimer, the term of this patent is extended or adjusted under 35 U.S.C. 154(b) by 563 days.

(21) Appl. No.: 12/291,758

(22) Filed: Nov. 13, 2008

(65) Prior Publication Data

US 2009/0140888 A1 Jun. 4, 2009

(30) Foreign Application Priority Data

Nov. 30, 2007 (JP) ................ P2007-311327

(51) Int. Cl.
G08B 21/00 (2006.01)
(52) U.S. Cl. ............ 340/995.1; 340/995.15; 701/212
(58) Field of Classification Search .......... 701/208, 701/212, 213; 340/995.1, 995.15, 995.14
See application file for complete search history.

(56) References Cited

U.S. PATENT DOCUMENTS

2008/0288166 A1* 11/2008 Onishi et al. ............. 701/209

FOREIGN PATENT DOCUMENTS

| JP | 8-251527 A | 9/1996 |
|---|---|---|
| JP | 09-252454 A | 9/1997 |
| JP | 10-307532 A | 11/1998 |
| JP | 2001-036840 A | 2/2001 |
| JP | 2002-324069 A | 11/2002 |
| JP | 2002-324228 A | 11/2002 |
| JP | 2004-069561 A | 3/2004 |
| JP | 2005-283630 A | 10/2005 |
| JP | 2005-308475 A | 11/2005 |
| JP | 2007-058088 A | 3/2007 |

* cited by examiner

*Primary Examiner* — Jeffery Hofsass
(74) *Attorney, Agent, or Firm* — Lerner, David, Littenberg, Krumholz & Mentlik, LLP (57) ABSTRACT

A map display apparatus for displaying a map image at a plurality of display resolutions includes the following elements. An information recording unit associates an image signal of a captured image with imaging position information to record the associated signal and information as image information. A map information storage unit stores map information for the map image. A classification information recording processing unit divides a map area shown by the map information into mesh cells such that different mesh cell sizes are suitable for the respective display resolutions, and generates and records imaging classification information. A display control unit determines on each of mesh cells on the map image, each mesh cell having a size suitable for the display resolution, on the basis of the imaging classification information whether the image information is relevant to a mesh cell, and arranges an imaging identification representation in the appropriate mesh cell.

9 Claims, 8 Drawing Sheets

| FILE NAME | SHOOTING DATE | TIME | IMAGE ID | LATITUDE AND LONGITUDE |
|---|---|---|---|---|
| DSC00001.JPG | 01/23/2007 | 09:35 | 1 | 35.6 × 51.4 |
| DSC00002.JPG | 01/23/2007 | 10:25 | 2 | 35.6 × 52.1 |
| DSC00003.JPG | 01/23/2007 | 10:43 | 3 | 35.6 × 52.3 |
| DSC00004.JPG | 01/23/2007 | 11:50 | 4 | 36.2 × 52.5 |
| DSC00005.JPG | 01/23/2007 | 12:35 | 5 | 36.3 × 53.3 |
| DSC00006.JPG | 01/23/2007 | 12:36 | 6 | 36.3 × 53.3 |
| DSC00007.JPG | 01/23/2007 | 12:57 | 7 | 36.4 × 53.5 |
| DSC00008.JPG | 01/23/2007 | 14:21 | 8 | 37.1 × 53.5 |
| DSC00009.JPG | 01/23/2007 | 16:03 | 9 | 37.2 × 54.5 |
| DSC00010.JPG | 01/23/2007 | 16:04 | 10 | 37.2 × 54.6 |

FIG. 4

| MESH CELL | | | | MESH-CELL RELEVANT INFORMATION | |
|---|---|---|---|---|---|
| LATITUDE | | LONGITUDE | | | |
| MS1 UNITS: 10 DEGREES | MS2 UNITS: 1 DEGREE | MS1 UNITS: 10 DEGREES | MS2 UNITS: 1 DEGREE | NUMBER OF IMAGES | ID ARRANGEMENT |
| 3 | 5 | 5 | 1 | 1 | 1 |
|  |  |  | 2 | 2 | 2, 3 |
|  | 6 |  | 1 | 1 | 4 |
|  |  |  | 3 | 3 | 5, 6, 7 |
|  | 7 |  | 1 | 1 | 8 |
|  |  |  | 4 | 2 | 9, 10 |

FIG. 5

| TIME | LATITUDE AND LONGITUDE |
|---|---|
| 9:10 | 35.5 × 51.2 |
| 9:20 | 35.6 × 51.4 |
| 9:30 | 35.6 × 51.4 |
| 9:40 | 35.6 × 51.7 |
| 9:50 | 35.6 × 51.9 |
| 10:00 | 35.6 × 52.0 |
| 10:10 | 35.6 × 52.1 |
| 10:20 | 35.6 × 52.2 |
| 10:30 | 35.6 × 52.2 |
| 10:40 | 35.6 × 52.4 |
| 10:50 | 35.8 × 52.5 |
| 11:00 | 36.0 × 52.5 |
| ⋮ | ⋮ |

FIG. 6

| MESH CELL | | | | | | MESH-CELL RELEVANT INFORMATION | |
|---|---|---|---|---|---|---|---|
| LATITUDE | | | LONGITUDE | | | | |
| MS1 UNITS: 10 DEGREES | MS2 UNITS: 1 DEGREE | MS3 UNITS: 0.2 DEGREE | MS1 UNITS: 10 DEGREES | MS2 UNITS: 1 DEGREE | MS3 UNITS: 0.2 DEGREE | NUMBER OF INFORMATION BLOCKS | TIME |
| 3 | 5 | 4 | 5 | 1 | 2 | 1 | 9:10 |
| | | 6 | | | 4 | 2 | 9:20, 9:30 |
| | | | | | 6 | 1 | 9:40 |
| | | | | | 8 | 1 | 9:50 |
| | | 8 | | 2 | 0 | 2 | 10:00, 10:10 |
| | 6 | 0 | | | 2 | 2 | 10:20, 10:30 |
| | | | | | 4 | 1 | 10:40 |
| | | | | | | 1 | 10:50 |
| | | | | | | 1 | 11:00 |

APPARATUS AND METHOD FOR MAP DISPLAY AND IMAGING APPARATUS AT A PLURALITY OF DISPLAY RESOLUTIONS

CROSS REFERENCES TO RELATED APPLICATIONS

The present application claims priority from Japanese Patent Application No. JP 2007-311327, filed in the Japanese Patent Office on Nov. 30, 2007, the entire content of which is incorporated herein by reference.

BACKGROUND OF THE INVENTION

1. Field of the Invention

The present invention relates to an apparatus and method for map display and an imaging apparatus. In particular, the present invention relates to a technique of displaying a map image at a plurality of display resolutions such that the map image is divided into mesh cells each having a size suitable for a selected display resolution in order to easily display imaging locations related to recorded images or a route in units of mesh cells.

2. Description of the Related Art

In recent years, recording media having a large recording capacity have been widely diffused. Providing such a recording medium for a digital camera allows for storage of a large amount of images. As for organization of many images stored in such a recording medium, many methods for displaying imaging locations on a map have been proposed. However, when many stored images are directly plotted on the map, the images cover the map. There is little point to plot images on the map. Assuming that thumbnails or alternate icons are plotted on the map instead of the images, when the number of thumbnails or alternate icons is increased, the thumbnails or alternate icons may cover the map. Similarly, there is little point to plot the thumbnails or alternate icons on the map.

Japanese Patent No. 3742141 discloses a technique of, when a plurality of position information blocks concerning imaging locations close to each other are read out, combining the position information blocks to form one icon and displaying the icon such that the icon has a size representing the number of images corresponding to the information blocks (refer to paragraphs [0048] to [0050], [0055], and [0056]).

SUMMARY OF THE INVENTION

According to this technique disclosed in Japanese Patent No. 3742141, after the position information blocks concerning the imaging locations close to each other are read out, it is necessary to perform a process of determining whether the locations are close to each other to such an extent that they are not distinguished from each other on a screen and a process of combining the locations close to each other to form a mark and displaying the mark such that the size of the mark is proportional to the number of images captured in the respective locations. When a large number of images are processed, therefore, it takes much time to perform the determining process, leading to remarkably reduced usability. Furthermore, it is necessary to retrieve an image included in a map viewable portion from the stored images. This results in a reduction in display speed.

It is desirable to provide an apparatus and method for map display and an imaging apparatus which are capable of easily displaying information concerning, for example, imaging locations.

The concept of the present invention is as follows: When a map image is displayed at a plurality of display resolutions, a map area shown by map information is divided into mesh cells such that different mesh cell sizes are suitable for the respective display resolutions. Specifically, the map area is divided into mesh cells such that the size of each mesh cell in one mesh is different from that in another mesh, thus layering meshes in order to select a mesh including mesh cells each having a size suitable for the display resolution of the map image. In addition, imaging classification information about classifying image information according to imaging position information with respect to a mesh cell to which the image information is relevant is generated. The image information contains an image signal of a captured image and the imaging position information. Specifically, the relationship between the layered meshes and the image information is clarified using the imaging classification information. Furthermore, whether the image information is relevant to a mesh cell is determined on each of mesh cells on the map image, each mesh cell having a size suitable for the display resolution of the map image, on the basis of the imaging classification information so that an imaging location can be easily displayed.

According to an embodiment of the present invention, a map display apparatus for displaying a map image at a plurality of display resolutions includes the following elements. An information recording unit associates an image signal of a captured image generated through an imaging unit with imaging position information generated through a position information generating unit to record the associated signal and information as image information, the imaging position information indicating the position of the imaging unit upon generation of the image signal. A map information storage unit stores map information for displaying the map image. A classification information recording processing unit divides a map area shown by the map information into mesh cells such that different mesh cell sizes are suitable for the respective display resolutions, generates imaging classification information about classifying the image information according to the imaging position information with respect to a mesh cell to which the image information is relevant, and records the imaging classification information. A display control unit determines on each of the mesh cells on the map image, each mesh cell having a size suitable for the display resolution of the map image, on the basis of the imaging classification information whether the image information is relevant to a mesh cell, and arranges an imaging identification representation in the mesh cell determined to be relevant to the image information, the imaging identification representation indicating that the mesh cell includes an imaging location associated with the captured image.

According to another embodiment of the present invention, there is provided a method for map display in a map display apparatus that displays a map image at a plurality of display resolutions. The method includes the steps of reading out image information from an information recording unit that associates an image signal of a captured image generated through an imaging unit with imaging position information generated through a position information generating unit to record the associated signal and information as the image information, the imaging position information indicating the position of the imaging unit upon generation of the image signal, dividing a map area shown by map information for displaying the map image into mesh cells such that different mesh cell sizes are suitable for the respective display resolutions to generate imaging classification information about classifying the read-out image information according to the imaging position information with respect to a mesh cell to which the image information is relevant, and determining on each of the mesh cells on the map image, each mesh cell having a size suitable for the display resolution of the map image, on the basis of the imaging classification information whether the image information is relevant to a mesh cell to arrange an imaging identification representation in the mesh cell determined to be relevant to the image information, the imaging identification representation indicating that the mesh cell includes an imaging location related to the captured image.

According to another embodiment of the present invention, an imaging apparatus capable of displaying a map image at a plurality of display resolutions includes the following elements. An imaging unit generates an image signal of a captured image. A position information generating unit generates position information indicating the position of the imaging unit. An information recording processing unit associates the image signal of the captured image with imaging position information, serving as the position information generated through the position information generating unit upon generation of the image signal, to record the associated signal and information as image information. A map information storage unit stores map information for displaying the map image. A classification information recording processing unit divides a map area shown by the map information into mesh cells such that different mesh cell sizes are suitable for the respective display resolutions, generates imaging classification information about classifying the image information according to the imaging position information with respect to a mesh cell to which the image information is relevant, and records the imaging classification information. A display control unit determines on each of the mesh cells on the map image, each mesh cell having a size suitable for the display resolution of the map image, on the basis of the imaging classification information whether the image information is relevant to a mesh cell, and arranges an imaging identification representation in the mesh cell determined to be relevant to the image information, the imaging identification representation indicating that the mesh cell includes an imaging location related to the captured image.

According to the embodiments of the present invention, a map area shown by map information is divided into mesh cells such that different mesh cell sizes are suitable for respective display resolutions, and imaging classification information about classifying image information according to imaging position information with respect to a mesh cell to which the image information is relevant, the imaging information containing an image signal of a captured image and the imaging position information. On the basis of the imaging classification information, whether the image information is relevant to a mesh cell is determined on each of mesh cells on the map image, each mesh cell having a size suitable for the display resolution of the map image. An imaging identification representation is arranged in the mesh cell determined to be relevant to the image information, the representation indicating that the mesh cell includes an imaging location related to the captured image.

Accordingly, since image information relevant to a mesh cell can be obtained quickly without performing a process of retrieving the relevant image information from all of image information blocks in each mesh cell, information concerning an imaging location can be easily displayed.

DESCRIPTION OF THE PREFERRED EMBODIMENTS

Figure 1:
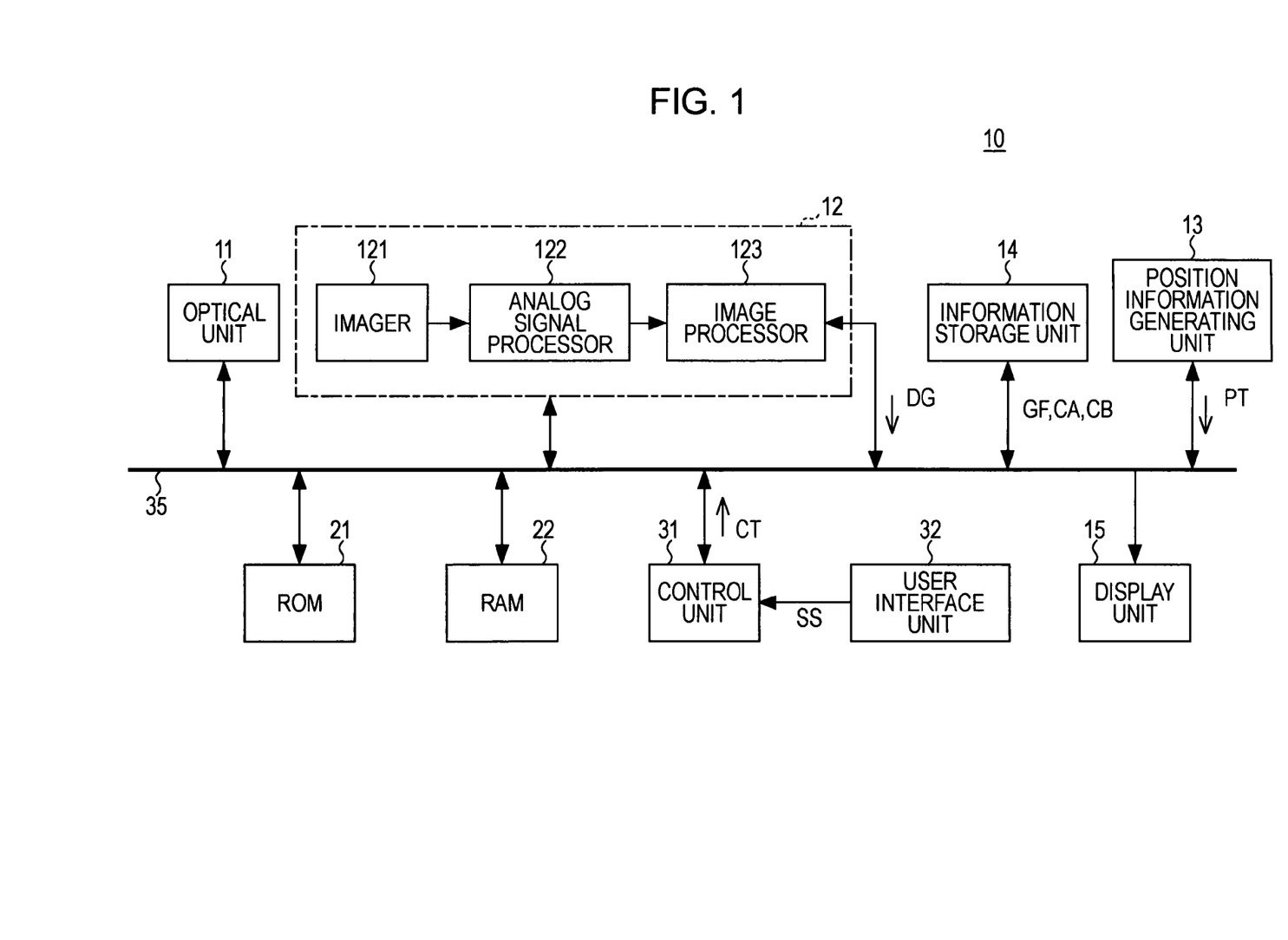
FIG. 1 is a block diagram of the structure of an imaging apparatus according to an embodiment of the present invention.

An embodiment of the present invention will be described below with reference to the drawings. FIG. 1 is a block diagram illustrating the structure of an imaging apparatus to which a map display apparatus according to the embodiment of the present invention is applied.

The imaging apparatus, indicated at 10, includes an optical unit 11, which includes lenses and a zoom mechanism and forms an optical image on the imaging surface of an imager 121 disposed downstream of the optical unit 11 along the optical axis of the unit.

The imager 121 in an imaging unit 12 performs photoelectric conversion to generate an analog image signal corresponding to the optical image and supplies the signal to an analog signal processor 122. The analog signal processor 122 performs analog image signal processing, such as noise rejection and gain control, on the analog image signal supplied from the imager 121. The analog signal processor 122 includes an A/D converter to convert the resultant analog image signal into a digital image signal and supplies the digital image signal to an image processor 123.

The image processor 123 performs digital image signal processing, such as color control and image quality adjustment, on the digital image signal supplied from the analog signal processor 122. In addition, the image processor 123 compresses the resultant image signal or decompresses a compressed image signal. As for compression, a lossy compression method, e.g., JPEG (Joint Photographic Experts Group) may be used. The image processor 123 may generate a lossless-compressed or uncompressed signal in raw format or an uncompressed signal in tagged image file format (TIFF). Hereinafter, an uncompressed or compressed image signal will be termed "image signal DG".

A position information generating unit 13 includes a global positioning system (GPS) module. The GPS module includes an antenna that receives a GPS radio wave, a signal converter that converts the received radio wave into a signal, and a calculator that obtains position information. The GPS module is incorporated in the imaging unit 12. The position information generating unit 13 generates position information PT indicating the position of the imaging unit 12, the position being the same as that of the imaging apparatus 10 when the other part of the position information generating unit 13 is integrated with the imaging unit 12.

An information storage unit 14 includes a recording medium, such as a nonvolatile memory, an optical disk, or a hard disk drive. The information storage unit 14 corresponds to an information recording unit or a map information storage unit. The information storage unit 14 stores image information containing an image signal DG and position information PT associated with the image signal DG, the position information PT generated at predetermined time intervals through the position information generating unit 13, map information for displaying a map image, imaging classification information used for displaying a location where the image signal has been generated, and route information used for displaying a route of the imaging unit 12.

A display unit 15 includes a liquid crystal display device and displays a finder image on the basis of an image signal output from the imaging unit 12. In addition, the display unit 15 displays a captured image based on an image signal stored in the information storage unit 14 and a map image based on map information stored in the information storage unit 14. The display unit 15 also displays various menus.

A ROM 21 stores a program for operating the imaging apparatus 10. A RAM 22 serves as a working memory for temporarily storing data during operation of the imaging apparatus 10.

A user interface unit 32 is connected to a control unit 31. The user interface unit 32 includes a shutter release and operation dials for switching an imaging mode. The user interface unit 32 generates an operation signal SS corresponding to a user operation and supplies the signal to the control unit 31.

The control unit 31 is connected to a bus 35 to connect to the respective units. The control unit 31 reads the program stored in the ROM 21 and executes the program to start the operation of the imaging apparatus 10. In addition, the control unit 31 generates a control signal CT in accordance with the operation signal SS supplied from the user interface unit 32 and supplies the control signal CT to the respective units, thus allowing the imaging apparatus 10 to operate in accordance with the user operation.

Assuming that the control unit 31 and, for example, the information storage unit 14 constitute an information recording processing unit, when an image signal of a captured image generated through the imaging unit 12 is recorded to the information storage unit 14, the control unit 31 uses position information PT, generated through the position information generating unit 13, indicating the position of the imaging unit 12 as imaging position information. The control unit 31 associates the imaging position information with the image signal and records the associated information and signal as image information GF in the information storage unit 14.

Assuming that the control unit 31 and, for example, the information storage unit 14 constitute a classification information recording processing unit, the control unit 31 divides a map area shown by map information into mesh cells at each of a plurality of display resolutions, generates imaging classification information CA about classifying the image information GF according to the imaging position information with respect to a mesh cell to which the image information GF is relevant, and records the generated imaging classification information CA in the information storage unit 14.

In addition, the control unit 31 performs display control on the basis of map information stored in the information storage unit 14 so that a map image is displayed on a screen of the display unit 15 at a display resolution desired by a user. At that time, the control unit 31 displays an imaging identification representation in a corresponding mesh cell on the map image on the basis of the recorded imaging classification information CA in each mesh suitable for a display resolution of the displayed map image, the imaging identification representation indicating a mesh cell that includes an imaging location of the recorded image signal.

Furthermore, the control unit 31 performs the following processes: a process for recording position information, generated at predetermined time intervals through the position information generating unit 13, as route identification information to the information storage unit 14; a process for generating route classification information CB about classifying the route identification information with respect to a mesh cell to which the route identification information is relevant, and recording the route classification information CB to the information storage unit 14; and a process for displaying a route identification representation in a corresponding mesh cell on the map image on the basis of the recorded route classification information CB in each mesh suitable for a display resolution of the displayed map image, the route identification representation indicating a route where the imaging unit 12 has been located.

Figure 2:
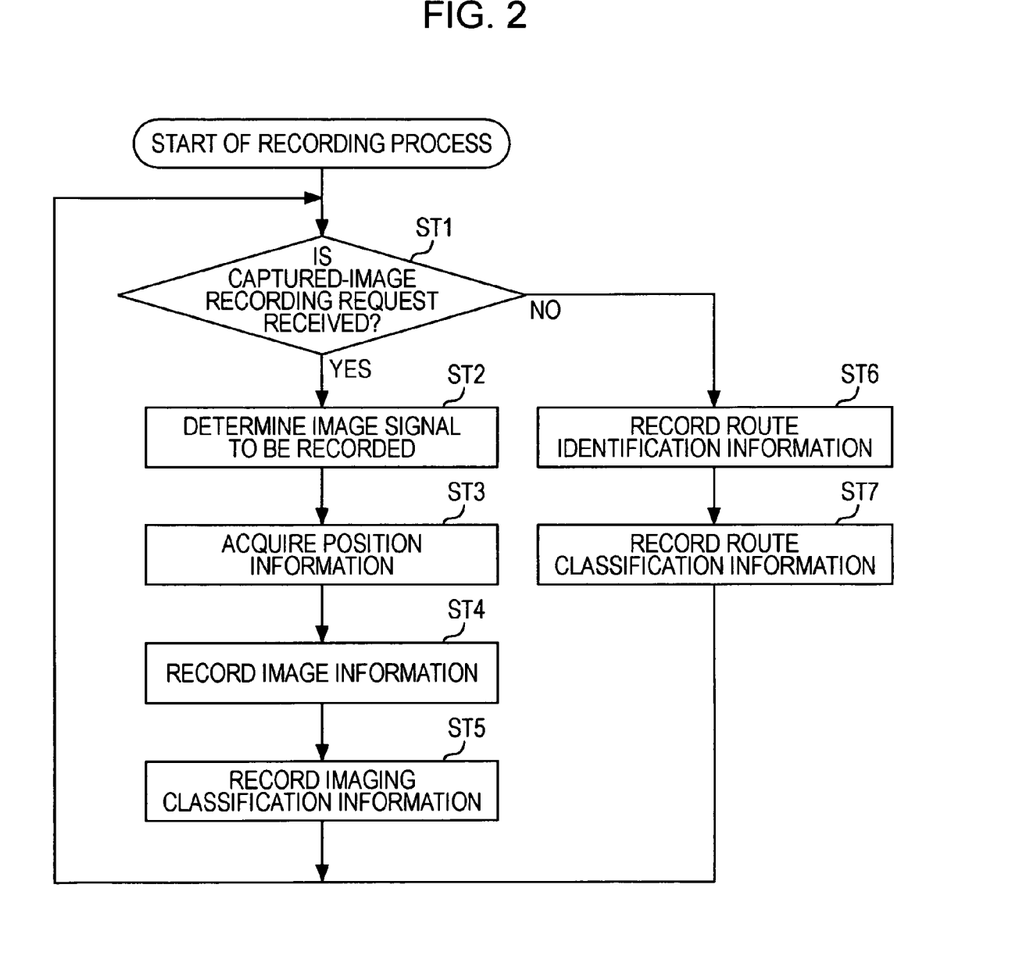
FIG. 2 is a flowchart of an operation for recording a captured image.

An operation of the imaging apparatus 10 will now be described. FIG. 2 is a flowchart showing an operation for recording a captured image. In step ST1, the control unit 31 determines whether a captured-image recording request is received. When the control unit 31 receives the captured-image recording request, i.e., when the control unit 31 determines that the shutter release (REC button) of the user interface unit 32 is operated, the process proceeds to step ST2. When the control unit 31 does not determine that the shutter release (REC button) is not operated, the process proceeds to step ST6.

In step ST2, the control unit 31 determines a target image signal to be recorded. In this instance, when the imaging apparatus 10 is set in a still image recording mode, the control unit 31 determines an image signal of a captured image, obtained upon operating the shutter release, as a target image signal. The process proceeds to step ST3. When the imaging apparatus 10 is set in a moving image recording mode, the control unit 31 determines an image signal of a captured image, obtained from the time when the REC button is operated to start recording to the time when the REC button is operated to stop recording, as a target image signal. The process proceeds to step ST3.

In step ST3, the control unit 31 acquires position information. Specifically, the control unit 31 acquires position information generated by the position information generating unit 13. The process proceeds to step ST4.

In step ST4, the control unit 31 performs processing to record image information. Specifically, the control unit 31 uses the position information acquired in step ST3 as imaging position information, associates the imaging position information with the target image signal determined in step ST2, and records the associated information and signal as image information GF in the information storage unit 14.

Assuming that the imaging apparatus 10 is set in, for example, the still image recording mode, a still image is recorded in a file format called exchangeable image file format (Exif) or in the design rule for camera file system (DCF) specification, serving as a camera file system specification using Exif. As for Exif, an image signal of a still image and Exif data constitute one file. Exif data may include taps indicating information concerning a corresponding still image and additional information concerning shooting date. Exif data may further include a tag "GPS Info" indicating GPS information. Accordingly, the control unit 31 generates a file in Exif or according to the DCF specification such that the imaging position information acquired from the position information generating unit 13 is set as a tag "GPS Info", and records the generated file as image information GF in the information storage unit 14.

Figure 3:
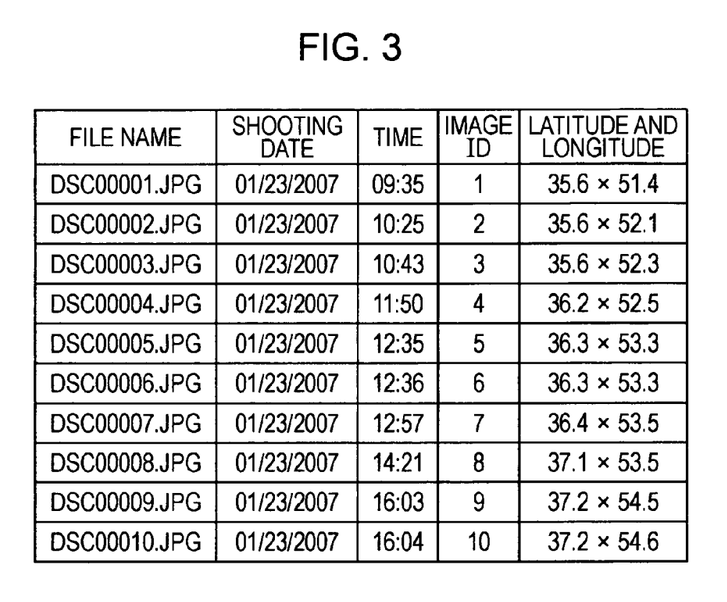
FIG. 3 is a diagram illustrating image information.

FIG. 3 illustrates a part of image information, or image information blocks. As described above, an image signal of a still image and Exif data constitute one file in Exif. FIG. 3 shows a list of file names and information blocks, indicated by tags in Exif data blocks, concerning, for example, shooting date, time, image ID, latitude, and longitude.

Assuming that a first still image is recorded at nine thirty-five on Jan. 23, 2007 in a location at latitude and longitude of "35.6×51.4", the control unit 31 creates a file "DSC0001.JPG" and records the file in the information storage unit 14. In this file "DSC0001.JPG", tags in Exif data indicate shooting date "Jan. 23, 2007", time "09:35", and latitude and longitude "35.6×51.4". Image ID is information for uniquely identifying a captured image. Captured images have different image IDs. The file "DSC0001.JPG" is assigned, for example, image ID "1".

When another still image is recorded, the control unit 31 creates a file "DSC0002.JPG" and records the file in the information storage unit 14. In the file "DSC0002.JPG", tags in Exif data indicate shooting date "Jan. 23, 2007", time "10:25", image ID "2", and latitude and longitude "35.6×52.1". Similarly, the control unit 31 creates a file "DSC0003.JPG" and the subsequent files, and records the files in the information storage unit 14 such that a file is created each time a still image is recorded.

Assuming that the imaging apparatus 10 is set in the moving image recording mode, the control unit 31 uses imaging position information as header information in a format used for recording a moving image. The control unit 31 may record imaging position information blocks in a database separately from image signals of still images and those of moving images and retrieve an imaging position information block associated with an image signal of a still image or a moving image.

In step ST5, the control unit 31 performs processing to record imaging classification information. Specifically, the control unit 31 divides a map area shown by map information into mesh cells at each display resolution, generates imaging classification information about classifying the image information GF according to the corresponding imaging position information with respect to a mesh cell to which the image information GF is relevant, and records the imaging classification information in the information storage unit 14.

In a case where a map image is displayed on the display unit 15, a fixed display resolution leads to a complicated operation for switching a viewable portion to confirm a wide range map. In addition, it is difficult to display part of a viewable portion in detail. Accordingly, the imaging apparatus 10 is configured to be capable of switching a display resolution to another display resolution upon displaying a map image. Assuming that a map area shown by map information is divided into mesh cells each having a fixed size, when the display resolution is lowered to display a wide range map, the interval between mesh lines is reduced on the displayed map image, so that it is difficult to distinguish the mesh cells from one another. On the other hand, if the display resolution is increased to display part of a viewable portion in detail, the interval between mesh lines is increased on a displayed map image, so that only one mesh cell is displayed. Therefore, the control unit 31 divides a map area shown by map information into mesh cells at each display resolution. In other words, a map area is divided into mesh cells such that the size of each mesh cell varies depending on the display resolution, thereby layering meshes.

The shape of a mesh cell may be appropriately set in accordance with, for example, a projection for displaying a map image and a manner of displaying information. In the following description, for the sake of easy understanding, it is assumed that a map image is displayed so that the latitude and longitude lines intersect at right angles, and the control unit 31 divides the map image into rectangular mesh cells on the basis of the latitude and longitude lines. For example, when the latitude and longitude lines are arranged every ten degrees, the mesh cells have a rectangular shape. In addition, the mesh cells are reduced in size such that, for example, the latitude and longitude lines are arranged every degree, and the map image is divided such that the mesh cells are further reduced in size, so that meshes can be layered.

Figure 4:
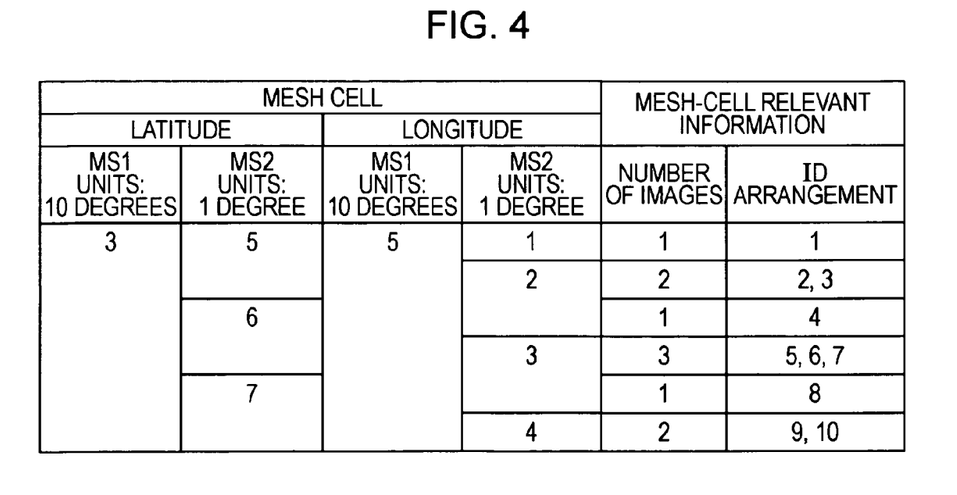
FIG. 4 is a diagram illustrating imaging classification information.

FIG. 4 illustrates imaging classification information blocks generated on the basis of the image information blocks shown in FIG. 3. FIG. 4 shows a case where two meshes are layered. Specifically, mesh division in one mesh is performed such that the latitude and longitude lines are arranged every ten degrees and that in the other mesh is performed such that the latitude and longitude lines are arranged every degree.

Upon recording the file "DSC0001.JPG", since the latitude and longitude coordinates of a location associated with the file "DSC0001.JPG" are "35.6×51.4", the control unit 31 generates imaging classification information such that the file "DSC0001.JPG" is relevant to a mesh cell MS1 of which the latitude number is "3" and the longitude number is "5" and is also relevant to a mesh cell MS2 of which the latitude number is "5" and the longitude number is "1". In this specification, the mesh cell MS1 has a size MS1 and is included in one mesh in which the latitude and longitude lines are arranged every ten degrees and the mesh cell MS2 has a size MS2 and is included in another mesh in which the latitude and longitude lines are arranged every degree. In addition, the control unit 31 generates information (hereinafter, "mesh-cell relevant information") relevant to a mesh cell using the number of images and image ID arrangement so as to grasp how captured images have been recorded at locations in the relevant mesh cell. For instance, the number of images in mesh-cell relevant information obtained upon recording the file "DSC0001.JPG" is "1". Since the image ID of the file "DSC0001.JPG" is "1", the image ID arrangement is "1".

Upon recording the file "DSC0002.JPG", since the latitude and longitude coordinates of a location associated with the file "DSC0002.JPG" are "35.6×52.1", the control unit 31 generates an entry such that the file "DSC0002.JPG" is relevant to the mesh cell MS1 of which the latitude number is "3" and the longitude number is "5" and is also relevant to a mesh cell MS2 of which the latitude number is "5" and the longitude number is "2". Upon recording the file "DSC0003.JPG", the latitude and longitude coordinates of a location associated with the file "DSC0003.JPG" are "35.6×52.3". The file "DSC0003.JPG" is relevant to the same mesh cells as those relevant to the file "DSC0002.JPG". Therefore, the control unit 31 does not generate a new entry and updates mesh-cell relevant information associated with the entry generated upon recording the file "DSC0002.JPG". In this case, the number of images in the mesh-cell relevant information is "2" and the image ID arrangement is "2, 3".

Similarly, the control unit 31 performs processing to record imaging classification information with respect to the subsequent files. When a file "DSC0010.JPG" is recorded, the resultant imaging classification information blocks are obtained as shown in FIG. 4. The imaging classification information blocks are recorded in the information storage unit 14. As described above, the control unit 31 performs processing to record imaging classification information. The process is returned to step ST1.

When the imaging classification information recording processing is performed each time an image signal of a captured image is stored to the information storage unit 14, loads on the control unit 31 can be distributed. The imaging classification information recording processing may be performed each time a predetermined number of captured images are recorded.

When it is determined in step ST1 that a captured image recording request is not received and the process proceeds to step ST6, the control unit 31 performs processing to record route identification information. The control unit 31 acquires position information from the position information generating unit 13 at predetermined time intervals. The control unit 31 records the acquired position information as route identification information in the information storage unit 14. Alternatively, the control unit 31 associates the acquired position information with time information and records the associated information blocks as route identification information in the information storage unit 14. The process proceeds to step ST7. In this instance, the control unit 31 sets a predetermined time interval in accordance with the extent of time resolution at which a route of the imaging unit 12 is determined.

Figure 5:
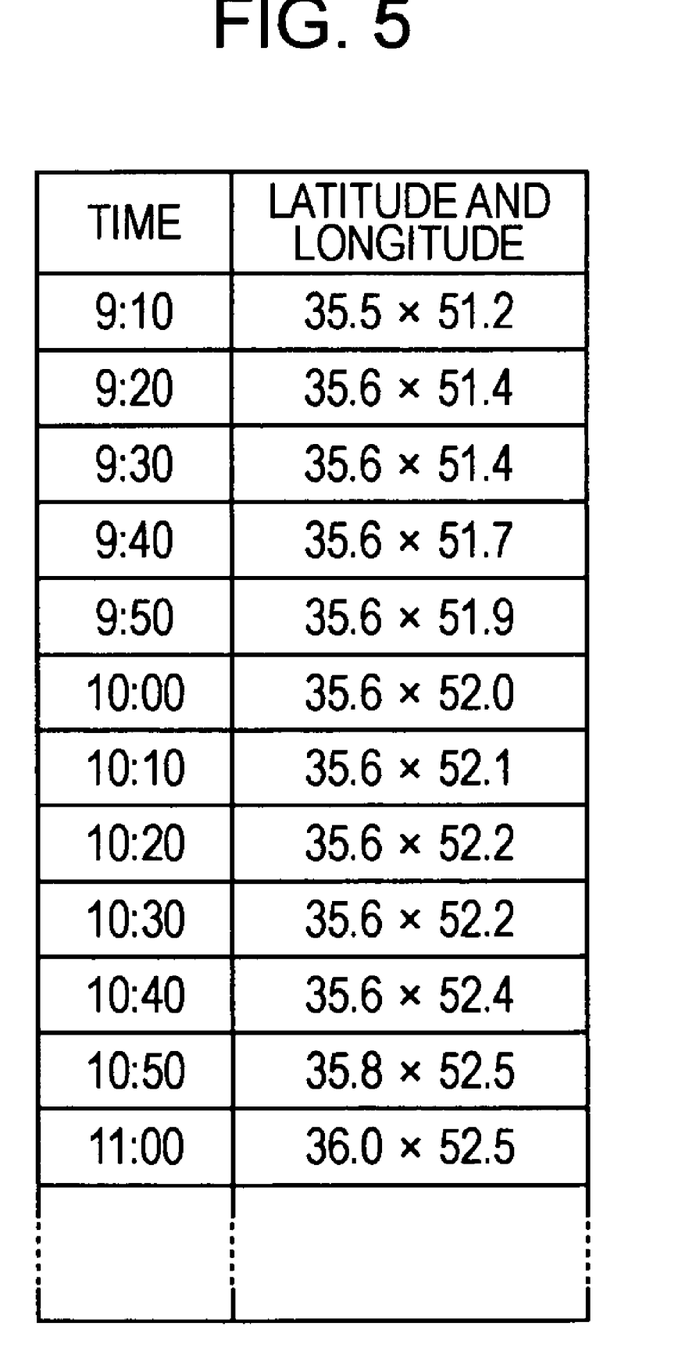
FIG. 5 is a diagram illustrating route identification information.

FIG. 5 illustrates route identification information blocks. For example, when a route is determined every ten minutes, the control unit 31 acquires position information from the position information generating unit 13 after a lapse of ten minutes from the last acquisition of position information.

In step ST7, the control unit 31 performs processing to record route classification information. The control unit 31 divides a map area shown by map information into mesh cells at each display resolution, generates route classification information about classifying the route identification information with respect to a mesh cell to which the route identification information is relevant, and records the generated route classification information in the information storage unit 14.

Figure 6:
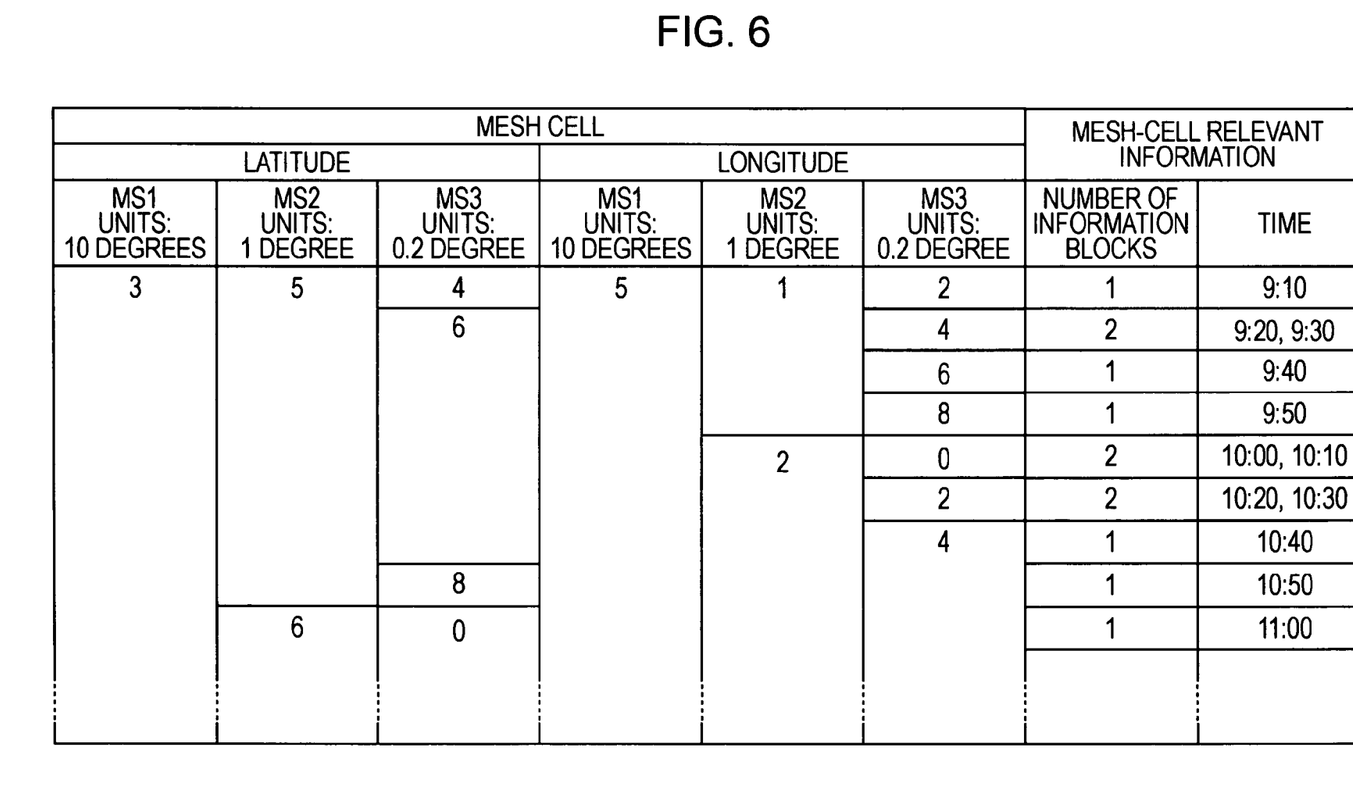
FIG. 6 is a diagram illustrating route classification information.

FIG. 6 illustrates route classification information blocks. FIG. 6 shows a case where meshes are layered so as to include the mesh divided into mesh cells MS1, the mesh divided into mesh cells MS2, and a mesh divided into mesh cells MS3 in which, for example, the latitude and longitude lines are arranged every 0.2 degree.

Upon recording position information acquired at time "9:10", since the latitude and longitude coordinates of a location associated with the position information are "35.5×51.2", the control unit 31 generates an entry such that the position information is relevant to a mesh cell MS1 of which the latitude number is "3" and the longitude number is "5", a mesh cell MS2 of which the latitude number is "5" and the longitude number is "1", and a mesh cell MS3 of which the latitude number is "4" and the longitude number is "2". Mesh-cell relevant information includes, for example, the number of position information blocks as the number of information blocks for each mesh cell and also includes information regarding time at which position information has been acquired so that a route can be displayed in the order of time. Only mesh cells including locations at the latitude and longitude coordinates contained in respective route identification information blocks may be recorded as route classification information blocks.

Upon recording position information acquired at time "9:20", since the latitude and longitude coordinates of a location associated with the position information are "35.6×51.4", the control unit 31 generates an entry such that the position information is relevant to the mesh cell MS1 of which the latitude number is "3" and the longitude number is "5", the mesh cell MS2 of which the latitude number is "5" and the longitude number is "1", and a mesh cell MS3 of which the latitude number is "6" and the longitude number is "4". Upon recording position information acquired at time "9:30", since the position information acquired at time "9:20" is relevant to the same mesh cells as those relevant to the position information acquired at time "9:30", the control unit 31 does not generate a new entry and updates the entry generated upon recording the position information acquired at time "9:20". Accordingly, corresponding mesh-cell relevant information indicates that the number of information blocks is "2" and time is "9:20, 9:30".

Similarly, the control unit 31 performs the processing to record route classification information with respect to the subsequent route identification information blocks, thus obtaining the resultant route classification information blocks as shown in FIG. 6. The route classification information blocks are recorded to the information storage unit 14. As described above, the control unit 31 performs the processing to record route classification information. The process is returned to step ST1.

Assuming that the route classification information recording processing is performed in step ST7 each time position information is acquired in step ST6, if a position-information acquisition time interval is short, the processing is often performed. Accordingly, when the route classification information recording processing is performed each time a predetermined number of position information blocks are acquired or the amount of information reaches a predetermined value, information can be efficiently recorded.

Shortening the position-information acquisition time interval results in an increase in the amount of data corresponding to route identification information blocks. Accordingly, the control unit 31 performs processing to detect a change in latitude and longitude coordinates in units of minimum mesh cells upon, for example, recording route classification information, and record route identification information and route classification information at the occurrence of a change in latitude and longitude coordinates in units of mesh cells. Specifically, the control unit 31 records entrance and exit time points associated with locations shown by position information blocks for each mesh cell. Consequently, since the amount of information is not increased when the position of the imaging unit 12 is not changed, route identification information and route classification information can be efficiently recorded.

Imaging classification information and route classification information may be independently recorded to the information storage unit 14 as described above. Alternatively, imaging classification information and route classification information may be recorded in the same list so as to share mesh cells.

Figure 7:
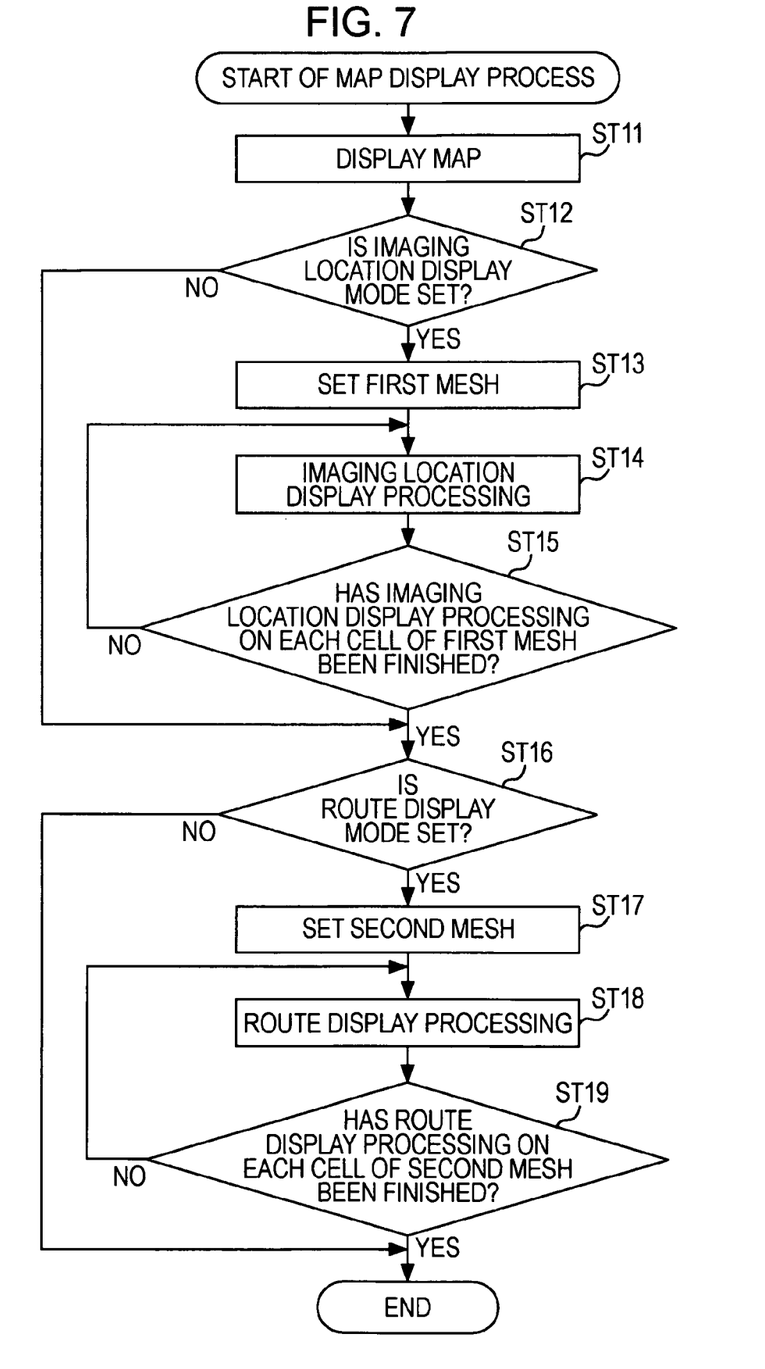
FIG. 7 is a flowchart showing an operation for displaying information.

An operation for displaying a map will now be described. FIG. 7 is a flowchart showing an operation for displaying information. In step ST11, the control unit 31 displays a map. Specifically, the control unit 31 reads out map information stored in the information storage unit 14 and displays a map image based on the read-out map information on the screen of the display unit 15. In this instance, when a location is specified on the map displayed on the display unit 15 in accordance with an operation signal SS supplied through the user interface unit 32, the control unit 31 reads out the map information with reference to the specified location and displays the map image such that the specified location is at the center of the screen. When any location is not specified, the control unit 31 displays the last displayed map image on the screen of the display unit 15. The process proceeds to step ST12.

In step ST12, the control unit 31 determines whether a display mode (hereinafter, "imaging location display mode") for displaying an imaging location on the map image is set.

When the control unit 31 determines that the imaging location display mode is set, the process proceeds to step ST13. When the control unit 31 determines that the imaging location display mode is not set, the process proceeds to step ST16.

In step ST13, the control unit 31 sets a mesh (hereinafter, "first mesh") composed of mesh cells each having a first size in accordance with a display resolution of the map image displayed on the display unit 15. The process proceeds to step ST14. The first mesh corresponds to any of meshes layered in imaging classification information.

Figure 8A:
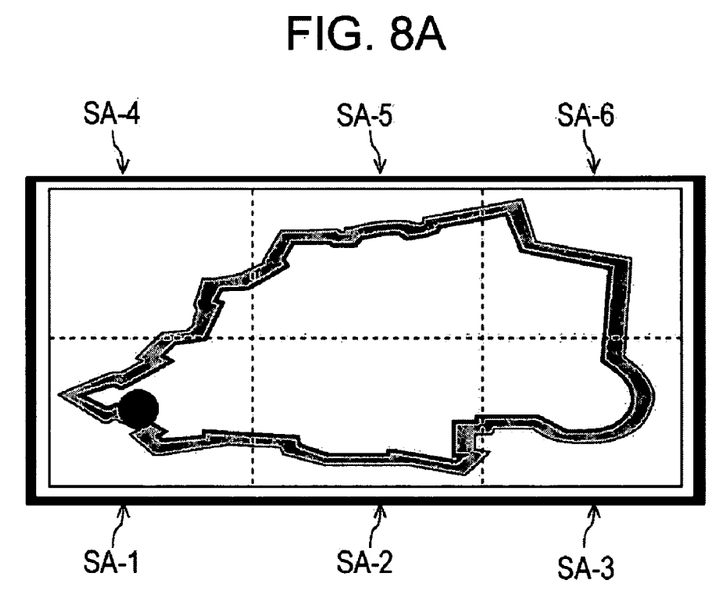
FIGS. 8A and 8B are diagrams explaining an operation for displaying an imaging location.
Figure 8B:
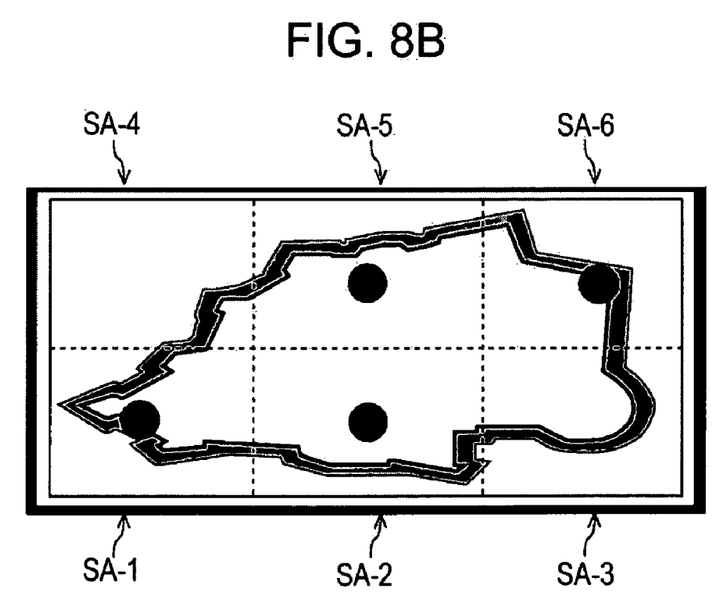

FIGS. 8A and 8B illustrate imaging location display examples. In this case, the first mesh is set in accordance with the display resolution of the map image displayed on the screen of the display unit 15 and an imaging identification representation indicating an imaging location is arranged in units of mesh cells.

As for the first mesh, for example, the map image is divided into mesh cells MS2, thus arranging six mesh cells SA1 to SA-6. The mesh cell SA-1 is an area of which the latitude is expressed as "35 degrees≦SA-1<36 degrees" and the longitude is expressed as "52 degrees≦SA-1<53 degrees". The mesh cell SA-2 is an area of which the latitude is expressed as "35 degrees≦SA-2<36 degrees" and the longitude is expressed as "53 degrees≦SA-2<54 degrees". The mesh cell SA-3 is an area of which the latitude is expressed as "35 degrees≦SA-3<36 degrees" and the longitude is expressed as "54 degrees≦SA-3<55 degrees". The mesh cell SA-4 is an area of which the latitude is expressed as "36 degrees≦SA-4<37 degrees" and the longitude is expressed as "52 degrees≦SA-4<53 degrees". The mesh cell SA-5 is an area of which the latitude is expressed as "36 degrees≦SA-5<37 degrees" and the longitude is expressed as "53 degrees≦SA-5<54 degrees". The mesh cell SA-6 is an area of which the latitude is expressed as "36 degrees≦SA-6<37 degrees" and the longitude is expressed as "54 degrees≦SA-6<55 degrees".

In step ST14, the control unit 31 performs imaging location display processing. Specifically, the control unit 31 specifies one mesh cell on which processing of displaying an imaging identification representation based on imaging classification information is not finished, and reads out imaging classification information relevant to the mesh cell. In addition, the control unit 31 generates an imaging identification representation on the basis of the read-out imaging classification information and displays the representation in the appropriate area on the map. For example, the control unit 31 specifies the mesh cell SA-1 and reads out imaging classification information relevant to the mesh cell SA-1. In this instance, assuming that the imaging classification information blocks have been generated as shown in FIG. 4, the mesh cell SA-1 corresponds to the mesh cell MS1 of which the latitude number is "3" and the longitude number is "5" and the mesh cell MS2 of which the latitude number is "5" and the longitude number is "1". Accordingly, the control unit 31 reads out the imaging classification information relevant to the mesh cell. The read-out imaging classification information indicates that the number of images is "1" and the image ID is "1".

The control unit 31 generates an imaging identification representation on the basis of the imaging classification information. As the imaging identification representation, a representation whereby the presence of an image captured in the mesh cell SA-1 can be recognized is arranged in the corresponding mesh cell SA-1. For example, a black circle "●" is arranged as an imaging identification representation at the center of the mesh cell SA-1.

In step ST15, the control unit 31 determines whether the imaging location display processing on each of the mesh cells on the map image has been finished. Specifically, the control unit 31 determines whether the imaging location display processing shown in step ST14 has been performed on, for example, each of the mesh cells SA-1 to SA-6 on the map image. When the control unit 31 determines that the processing on each of the mesh cells SA-1 to SA-6 has been finished, the process proceeds to step ST16. When there is a mesh cell on which the imaging location display processing is not performed, the process is returned step ST14.

In this case, when processing in steps ST13 to ST15 is performed, imaging identification representations based on respective imaging classification information blocks are arranged in the mesh cells on the map image as shown in FIG. 8B. Consequently, the mesh cells relevant to imaging locations of recorded captured images, i.e., the mesh cells in each of which an image has been captured and a captured image has been recorded can be easily recognized.

A mesh is set in accordance with a display resolution of a displayed map image, and imaging identification representations based on imaging classification information blocks associated with the mesh are arranged. For example, when mesh division is performed such that each mesh cell has a smaller size, imaging classification information is previously generated, and a map image is displayed at a higher resolution than that shown in FIGS. 8A and 8B, an imaging identification representation is arranged on the basis of the imaging classification information associated with a mesh composed of the smaller mesh cells. Consequently, this prevents the following problems: When the size of each mesh cell is too small relative to a map image, it is difficult to distinguish imaging identification representations from each other. Whereas, when the size of each mesh cell is too large relative to a map image, it is difficult to display imaging identification representations such that they are distinguished from each other.

In addition, since imaging classification information blocks are recorded such that layered mesh cells are used as indices as shown in FIG. 4, imaging classification information associated with a mesh cell on a map image can be read out quickly. Furthermore, on the basis of the read-out imaging classification information, an imaging identification representation can be arranged in the relevant mesh cell on the map image. Accordingly, an imaging location can be favorably displayed on the map image.

In FIGS. 8A and 8B, the imaging identification representations have a fixed display size. The display size of each imaging identification representation may vary depending on the number of images associated with the corresponding imaging classification information. Consequently, whether the number of captured images recorded is large can be easily determined.

In addition, an icon obtained by reducing a captured image may be arranged as an imaging identification representation. Consequently, what image has been recorded in which mesh cell can be easily recognized. Furthermore, the color or shape of an imaging identification representation may be changed depending on the type of captured image recorded, i.e., a still image or a moving image. Consequently, which mesh cell a still image or a moving image has been recorded in can be easily determined on the basis of an imaging identification representation displayed on a map image.

In step ST16, the control unit 31 determines whether a display mode (hereinafter, "route display mode") for displaying a route is set. When the control unit 31 determines that the route display mode is set, the process proceeds to step ST17. When the control unit 31 determines that the route display mode is not set, the display process is terminated.

In step ST17, the control unit 31 sets a mesh (hereinafter, "second mesh") composed of mesh cells each having a second size in accordance with the display resolution of the map image displayed on the display unit 15. The process proceeds to step ST18. The second mesh corresponds to any of the meshes layered in route classification information. When the second mesh is finer than the first mesh, a route can be displayed in detail on the map image.

Figure 9A:
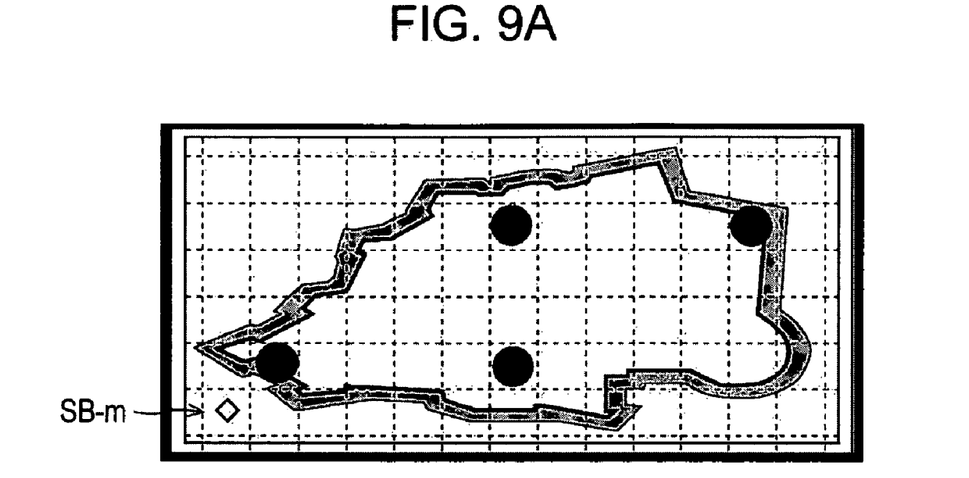
FIGS. 9A and 9B are diagrams explaining an operation for displaying an imaging location and a route.
Figure 9B:
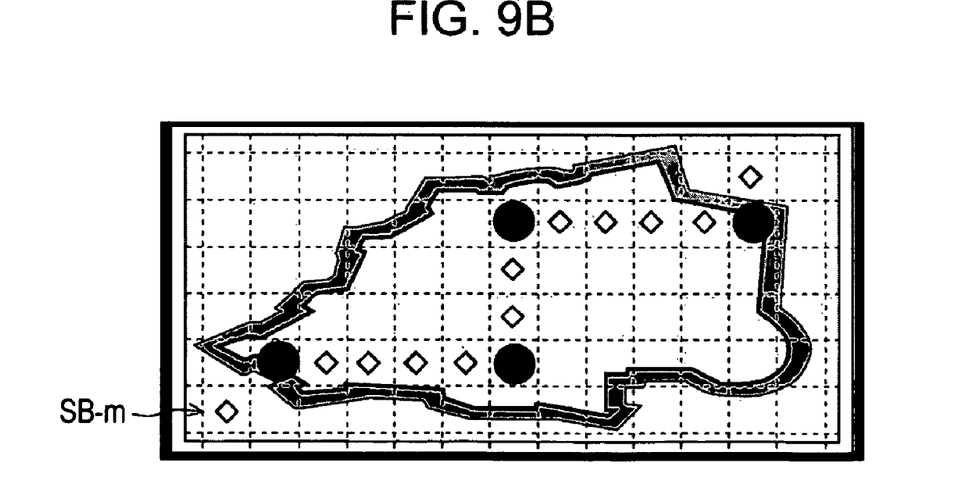

FIGS. 9A and 9B show display examples for imaging location and route. In this case shown in FIGS. 9A and 9B, the imaging identification representations are arranged as described above. In addition, the second mesh is set on the screen of the display unit 15 in accordance with the display resolution of the displayed map image so that route identification representations are arranged in units of mesh cells.

In the second mesh, for example, the map image is divided into mesh cells MS3 so as to provide smaller mesh cells than those for displaying imaging identification representations as shown in FIGS. 8A and 8B. In FIGS. 9A and 9B, a mesh cell SB-m is an area of which the latitude is expressed as "35.4 degrees≦SB-m<35.6 degrees" and the longitude is expressed as "51.2 degrees≦SB-m<51.4 degrees.

In step ST18, the control unit 31 performs route display processing. Specifically, the control unit 31 specifies one mesh cell on which processing of displaying a route identification representation based on route identification information is not finished, and reads route classification information relevant to the mesh cell. The control unit 31 further generates a route identification representation on the basis of the read-out route classification information and displays the route identification representation in the appropriate area on the map. For example, the control unit 31 specifies the mesh cell SB-m and reads out imaging classification information relevant to the mesh cell SB-m. In this instance, assuming that route classification information blocks have been generated as shown in FIG. 6, the mesh cell SB-m corresponds to the mesh cell MS1 of which the latitude number is "3" and the longitude number is "5", the mesh cell MS2 of which the latitude number is "5" and the longitude number is "1", and the mesh cell MS3 of which the latitude number is "4" and the longitude number is "2". Accordingly, the control unit 31 reads out route classification information relevant to the mesh cell. The read-out route classification information indicates that the number of information blocks is "1" and time is "9:10".

The control unit 31 generates a route identification representation on the basis of the route classification information. The route identification representation is arranged in the corresponding mesh cell SB-m such that a location in the mesh cell SB-m can be identified. For example, a white diamond "◇" is arranged as a route identification representation at the center of the corresponding mesh cell SB-m as shown in FIG. 9A.

In step ST19, the control unit 31 determines whether the route display processing has been performed on each mesh cell on the map image. Specifically, the control unit 31 determines whether the route display processing in step ST18 has been performed on each mesh cell of the second mesh on the map image. When the control unit 31 determines that the processing has been performed on each mesh cell of the second mesh, the map display process is terminated. When the control unit 31 determines that there is a mesh cell on which the route display processing is not performed, the process is returned to step ST18.

In this instance, when processing in steps ST17 to ST19 is performed, route identification representations based on respective route classification information blocks are displayed in units of mesh cells on the map image as shown in FIG. 9B. Consequently, the route can be easily recognized using the displayed route identification representations. In addition, a mesh is set in accordance with the display resolution of the displayed map image and route identification representations based on respective route classification information blocks associated with the mesh are arranged. Therefore, a disadvantage in that it is difficult to distinguish route identification representations from each other can be prevented in a manner similar to the arrangement of imaging identification representations.

Furthermore, route classification information is recorded using the layered mesh cells as indices as shown in FIG. 6, so that route classification information blocks associated with mesh cells on the map image can be read out quickly and route identification representations can be arranged in the relevant mesh cells on the map image on the basis of the read-out imaging classification information blocks. Accordingly, a route can be favorably displayed on the map image in addition to the imaging locations.

In FIGS. 9A and 9B, each route identification representation has a fixed display size. The duration during which the imaging unit 12 has been located in each mesh cell may be determined on the basis of the number of information blocks and time in the corresponding route classification information. The display size of the corresponding route identification representation may vary depending on the duration. Consequently, which mesh cell the imaging unit 12 has been located in for a long time can be determined on the basis of the route identification representations.

The above-described embodiment has been explained with respect to the case where the map display apparatus is applied to the imaging apparatus. When the imaging unit and the position information generating unit are arranged outside the apparatus and an image signal and position information are supplied to the apparatus from the imaging unit and the position information generating unit on the outside of the apparatus, alternatively, when a recording medium storing image signals and position information is loaded into the apparatus, the signals and the information are processed in a manner similar to the above-described embodiment, so that imaging locations can be favorably displayed on a map image.

It should be understood by those skilled in the art that various modifications, combinations, sub-combinations and alterations may occur depending on design requirements and other factors insofar as they are within the scope of the appended claims or the equivalents thereof.

What is claimed is:

1. A map display apparatus for displaying a map image at a plurality of display resolutions, the apparatus comprising:
   an information recording unit configured to associate an image signal of a captured image generated through an imaging unit with imaging position information generated through a position information generating unit to record the associated image signal and imaging position information as image information, the imaging position information indicating the position of the imaging unit upon generation of the image signal;
   a map information storage unit configured to store map information for displaying the map image;
   a classification information recording processing unit configured to divide a map area shown by the map information into mesh cells such that different mesh cell sizes are suitable for the respective display resolutions, generate imaging classification information about classifying the image information according to the imaging position information with respect to a mesh cell to which the image information is relevant, and record the imaging classification information; and a display control unit configured to determine on each of the mesh cells on the map image, each mesh cell having a size suitable for the display resolution of the map image, on the basis of the imaging classification information whether the image information is relevant to a mesh cell, and arrange an imaging identification representation in the mesh cell determined to be relevant to the image information, the imaging identification representation indicating that the mesh cell includes an imaging location related to the captured image.

2. The apparatus according to claim 1, wherein the information recording unit records position information as route identification information, the position information being generated through the position information generating unit at predetermined time intervals;

the classification information recording processing unit generates route classification information about classifying the route identification information with respect to a mesh cell to which the route identification information is relevant, and records the route classification information, and the display control unit determines on each of the mesh cells on the map image, each mesh cell having a size suitable for the display resolution of the map image, on the basis of the route classification information whether the route identification information is relevant to a mesh cell, and arranges a route identification representation in the mesh cell determined to be relevant to the route identification information, the route identification representation indicating that the imaging unit has been located in the mesh cell.

3. The apparatus according to claim 2, wherein the classification information recording processing unit divides the map area shown by the map information into first mesh cells and also divides the map area into second mesh cells such that different mesh cell sizes are suitable for the respective display resolutions, generates imaging classification information about classifying the image information according to the imaging position information with respect to a first mesh cell to which the image information is relevant and also generates route classification information about classifying the route identification information with respect to a second mesh cell to which the route identification information is relevant, and records the imaging classification information and the route classification information, and the display control unit determines on each of the first mesh cells on the map image, each first mesh cell having a size suitable for the display resolution of the map image, on the basis of the imaging classification information whether the image information is relevant to a first mesh cell, arranges the imaging identification representation in the first mesh cell determined to be relevant to the image information, determines on each of the second mesh cells on the map image, each second mesh cell having a size suitable for the display resolution of the map image, on the basis of the route classification information whether the route identification information is relevant to a second mesh cell, and arranges the route identification representation in the second mesh cell determined to be relevant to the route identification information.

4. The apparatus according to claim 1, wherein the display control unit displays an icon as the imaging identification representation.

5. The apparatus according to claim 4, wherein the image signal of the captured image generated through the imaging unit is that of a still image or a moving image, and the display control unit switches the representation of the icon depending on the still image or moving image of the image signal recorded as the image information.

6. The apparatus according to claim 5, wherein the display control unit changes the representation of the icon depending on the number of image information blocks determined to be relevant to the same mesh cell.

7. The apparatus according to claim 2, wherein the display control unit determines the duration, during which the imaging unit has been located in the same mesh, on the basis of the route identification information, and changes the route identification representation depending on the determined duration.

8. A method for map display in a map display apparatus that displays a map image at a plurality of display resolutions, the method comprising the steps of:

reading out image information from an information recording unit that associates an image signal of a captured image generated through an imaging unit with imaging position information generated through a position information generating unit to record the associated image signal and imaging position information as the image information, the imaging position information indicating the position of the imaging unit upon generation of the image signal;

dividing a map area shown by map information for displaying the map image into mesh cells such that different mesh cell sizes are suitable for the respective display resolutions to generate imaging classification information about classifying the read-out image information according to the imaging position information with respect to a mesh cell to which the image information is relevant; and determining on each of mesh cells on the map image, each mesh cell having a size suitable for the display resolution of the map image, on the basis of the imaging classification information whether the image information is relevant to a mesh cell to arrange an imaging identification representation in the mesh cell determined to be relevant to the image information, the imaging identification representation indicating that the mesh cell includes an imaging location related to the captured image.

9. An imaging apparatus capable of displaying a map image at a plurality of display resolutions, the apparatus comprising:

an imaging unit configured to generate an image signal of a captured image;

a position information generating unit configured to generate position information indicating the position of the imaging unit;

an information recording processing unit configured to associate the image signal of the captured image with imaging position information, serving as the position information generated through the position information generating unit upon generation of the image signal, to record the associated image signal and imaging position information as image information;

a map information storage unit configured to store map information for displaying the map image;

a classification information recording processing unit configured to divide a map area shown by the map information into mesh cells such that different mesh cell sizes are suitable for the respective display resolutions, generate imaging classification information about classifying the image information according to the imaging position information with respect to a mesh cell to which the image information is relevant, and record the imaging classification information; and a display control unit configured to determine on each of the mesh cells on the map image, each mesh cell having a size suitable for the display resolution of the map image, on the basis of the imaging classification information whether the image information is relevant to a mesh cell, and arrange an imaging identification representation in the mesh cell determined to be relevant to the image information, the imaging identification representation indicating that the mesh cell includes an imaging location related to the captured image.

* * * * *